US007003314B1

(12) United States Patent
Iselt

(10) Patent No.: US 7,003,314 B1
(45) Date of Patent: Feb. 21, 2006

(54) SYSTEM FOR THE COMMON OPERATION OF DIGITAL RADIO DEVICES ADJUSTABLE ACCORDING TO DIFFERENT WAVEFORMS

(75) Inventor: Peter Iselt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 616 days.

(21) Appl. No.: 09/980,915

(22) PCT Filed: Jun. 19, 2000

(86) PCT No.: PCT/EP00/05624

§ 371 (c)(1),
(2), (4) Date: Mar. 28, 2002

(87) PCT Pub. No.: WO01/10050

PCT Pub. Date: Feb. 8, 2001

(30) Foreign Application Priority Data

Aug. 2, 1999 (DE) ................................ 199 36 309

(51) Int. Cl.
H04B 1/38 (2006.01)
(52) U.S. Cl. .................................. 455/552.1; 370/389
(58) Field of Classification Search ................ 455/418, 455/419, 420, 550.1, 552.1, 553.1; 370/389, 370/390, 392
See application file for complete search history.

(56) References Cited

U.S. PATENT DOCUMENTS 5,448,765 A 9/1995 Kovanen et al. .............. 455/90

6,091,765 A * 7/2000 Pietzold et al. ............. 375/219

FOREIGN PATENT DOCUMENTS

DE 19532069 C2 8/1995
DE 19819422 A1 4/1998

OTHER PUBLICATIONS

Lackey, R. J., et al., "Speakeasy: The Military Software Radio", IEEE Communications Magazine, 33 (May 1995), No. 5, pp. 56-61.
Gunn, J. E., et al., "A Low-Power DSP Core-Based Software Radio Architecture", IEEE Journal On Selected Areas In Communications, vol. 17, No. 4, Apr. 1999, pp. 574-590.

* cited by examiner

Primary Examiner—Lee Nguyen
(74) Attorney, Agent, or Firm—McDermott Will & Emery, LLP

(57) ABSTRACT

The disclosure relates to a system for the operation of digital radio devices adjustable according to different waveforms and having a common waveform that is predetermined by a radio center. The system divides the sets of parameters which define the waveforms into several sets of partial parameters that are associated with addresses. In the radio devices which are due to be operated in common, the respective sets of partial parameters are stored at the addresses. In order to set a common waveform, only the addresses of the partial parameters required for the selected waveform are transmitted and selected by the radio center as the set of parameters determining the selected waveform, by means of a radio link common to all of the radio devices.

3 Claims, 1 Drawing Sheet

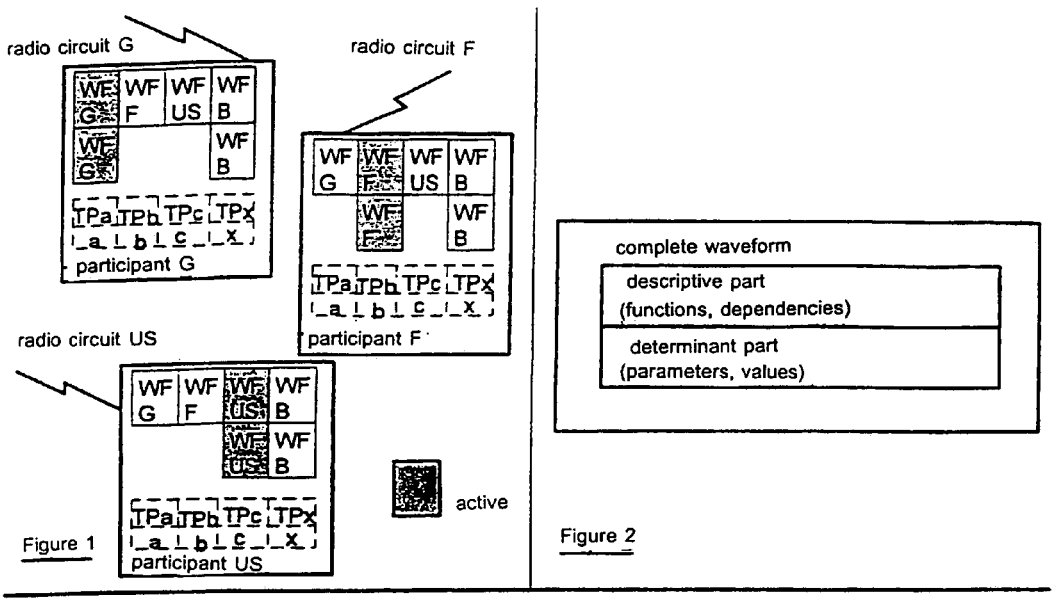
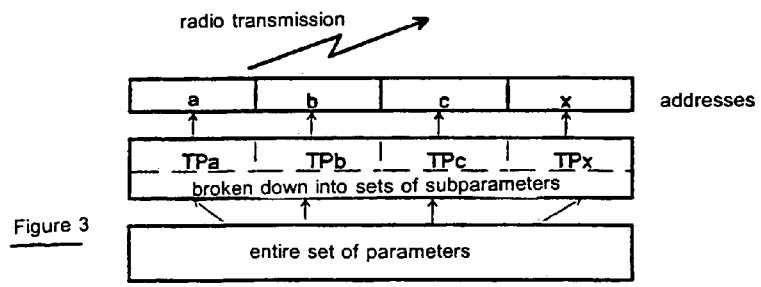
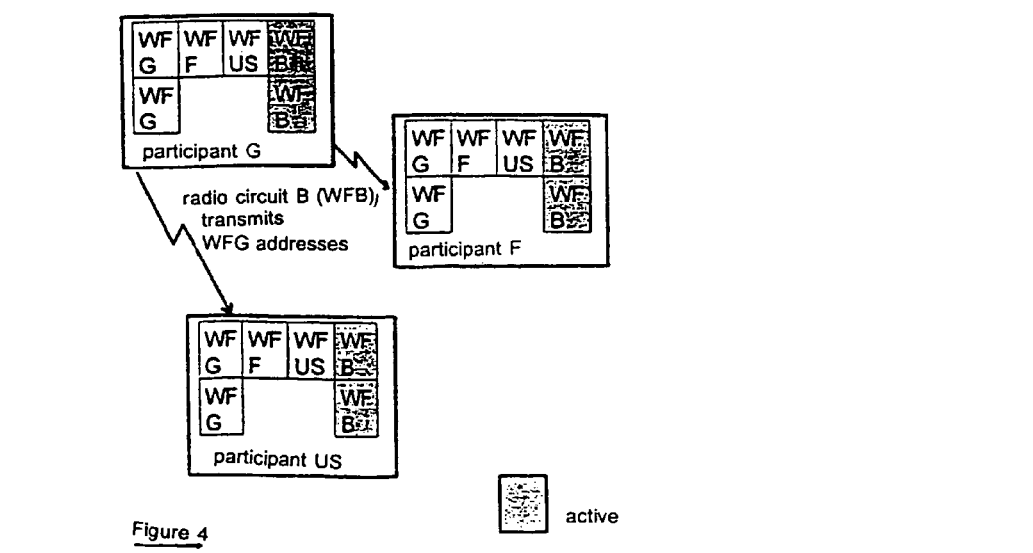

SYSTEM FOR THE COMMON OPERATION OF DIGITAL RADIO DEVICES ADJUSTABLE ACCORDING TO DIFFERENT WAVEFORMS

The invention relates to, and proceeds from, a system according to the preamble of the main claim.

Modern digital technology makes it possible to provide in future digital radio transmitting and/or receiving appliances that have an essentially identical hardware construction and can be operated with different waveforms by reading in different software. In this context, waveform is understood as meaning the signal that appears at the output of the antenna at the transition from the appliance to the radio link and that is determined by a multiplicity of parameters, such as frequency, type of modulation, power, signal shape (e.g. frequency-hopping method). Such a waveform may be determined, depending on complexity, by, for example 20 to 200 individual parameters that are mutually dependent and that are combined to form a set of parameters and are read into the transmitting appliance and/or receiving appliance as software so that the appliance can then be operated with this selected waveform. This modern multifunctional radio appliance principle is described in greater detail, for example, in the paper entitled "Multifunctional Radio Platform for Dual-Use Applications" by Peter Iselt, AFCEA Conference, Munich, 20/21 Apr. 1999.

Such multifunctional radio appliances have hitherto been operated by the various operators with different waveforms and are not interoperable. It would indeed be possible to store all the conceivable or relevant waveforms in such multifunctional radio appliances as complete sets of parameters that can be retrieved by a switch-over command so that such radio appliances can be operated with a common waveform. However, this cannot be achieved in practice because of the enormous memory capacity required for it and the consequently unacceptable loading of the radio appliances platform.

The object of the invention is to disclose a system with which such multifunctional radio appliances can be quickly adjusted via a centre to a predetermined common waveform so that such multifunctional radio appliances initially operated in different systems can communicate with one another in the shortest time.

Proceeding from a system according to the preamble of the main claim, this object is achieved by its characterizing features. An advantageous development emerges from the subclaim.

In accordance with the invention, multifunctional radio appliances that originally operate in various communication systems with different waveforms can be rapidly converted via a centre to a common waveform and thus communicate with one another. For this purpose, it is not the entire set of parameters of the desired common waveform that is transmitted to the individual radio appliances from the centre, but only individual addresses that are assigned to appropriate sets of subparameters that, when combined then yield the entire set of parameters for the desired waveform. This transmission of only individual addresses can take place very rapidly in the shortest time with high transmission reliability. Whereas several hours may be necessary to transmit an entire set of parameters, individual addresses can be transmitted in a few seconds or minutes.

In accordance with a further development of the invention, it has proved expedient to divide the entire software determining a waveform into two subpackets and to store that part of the software that describes the functions and dependencies of the parameters of a set of parameters in the individual radio appliances so that only that determinant part of the software that comprises the sets of parameters has to be retrieved by radio via the individual addresses in order to operate the radio appliances with a selected waveform. Although the descriptive part of the waveform software could likewise be read out under these circumstances by radio via the appropriate addresses in a waveform-specific combination, it has proved expedient to store said descriptive part of the software in the radio appliance as a permanent software component and to read out only the waveform-specific sets of subparameters via the addresses by radio.

The system according to the invention is suitable both for the civil and for the military communication sector. Thus, for example, actions can be carried out with participants from different alliances that are each working with different technology standards. The cooperation of civil, state or military organizations in the field of catastrophe prevention or in the case of peacekeeping measures is also substantially improved by the system according to the invention.

The invention is explained in greater detail in the following on the basis of an exemplary embodiment with reference to a diagrammatic drawing.

FIG. 1 shows the application of the system according to the invention in a crisis zone in which three different radio systems are being operated, for example a German radio system G that operates with a waveform WFG, a French system F that operates with a waveform WFF and a US radio system US that operates according to the waveform WFUS. All of these three initially different radio systems, each comprising radio transmitters and radio receivers, are roughly the same or even identical in regard to their architecture (structure), but they can be adjusted to different waveforms by inputting appropriate software via sets of parameters. In addition, a common radio connection, having, for example, a waveform WFB that is available at least at certain times and makes possible information exchange between the three initially separate radio systems exists between these three different radio systems G, F and US.

If the three radio systems are now to make contact with one another, for example for tactical reasons, and this is desired, for example, by the German radio system G as managing unit, the command that said radio systems F and US should also be converted to the waveform WFG is transmitted via the common radio connection WFB from the unit G acting as centre to the two other radio systems F and US.

For this purpose, the software for the waveform WFG is transmitted to the participants in the radio systems F and US via the common radio connection WFB.

Since the transmission of the entire software determining the waveform WFG would take several hours, the software determining the waveform WFG is divided, in accordance with FIG. 2, into two subpackets, namely a descriptive part and a determinant part. The descriptive part comprises the functions and dependencies of the respective parameters of the waveform, whereas the determinant part comprises the actual parameters and their values. The descriptive part is stored completely in the radio appliance and is part of the operating software for the radio appliance. The sets of parameters of the determinant part for the various possible waveforms are each divided, in accordance with FIG. 3, into sets of subparameters to which appropriate addresses are assigned. A set of parameters for a specific waveform, for example WFG, may comprise, for example, one hundred individual parameters or more. All these sets of parameters for the various waveforms are divided into sets of subparameters TPa, TPb, TPc . . . TPx and, specifically, such individual parameters are combined in each case to form sets of subparameters so that said sets of parameters can be used for a plurality of entire sets of parameters of different waveforms. Each of said sets of subparameters TPa to TPx is assigned in each case an address a, b to x. Said sets of subparameters with the addresses assigned to them are stored in all the radio appliances of the various radio systems G, F and US and, specifically, together with the associated descriptive part of the software in each case.

If a reprogramming of the radio appliances of all three radio systems G, F and US to the waveform WFG is now required via the radio system G acting as centre in the context of the above example, there are transmitted via the radio connection WFB, in accordance with FIG. 4 only the addresses whose associated sets of subparameters yield, when combined, the set of parameters that, together with the descriptive part of the software, corresponds to the waveform WFG. Said sets of subparameters are read out of the associated memories of the appliances of the systems F and US and the appropriate appliances are thus adjusted to the common waveform WFG in the shortest time so that the three radio systems G, F and US can communicate with one another via WFG.

The transmission of only addresses via the connection WFB can take place very reliably and error-free, optionally also in encrypted form, so that faulty operations are avoided.

What is claimed is:

1. System for operating digital radio appliances that can be adjusted to operate with various waveforms, wherein each of the waveforms is the signal occurring at the transition from a radio appliance to a radio link at the output of an antenna and that is determined by a multiplicity of parameters, including frequency, type of modulation, power, signal shape, having a common waveform set by a center, in which system the waveforms of the radio appliances can be adjusted by sets of parameters inputted as software, wherein the sets of parameters of the various waveforms are subdivided into a plurality of sets of subparameters to each of which an address is assigned, the associated sets of subparameters are each stored in the digital radio appliances to be operated jointly under said addresses and, to adjust to a common waveform, only the addresses of the subparameters necessary for the chosen waveform are transmitted by the center via a radio connection common to all the radio appliances and are read out therein as the total set of parameters determining the chosen waveform.

2. System according to claim 1, wherein the software determining the various waveforms is divided into a describing part describing the functions and dependencies of the parameters and a determining part comprising the actual parameters, the describing part of the software is stored in each of the radio appliances and only the determining part of the software is subdivided into sets of subparameters that can be retrieved through addresses by radio so that the waveform-specific software is formed in the radio appliances from the sets of subparameters read out via the addresses by radio together with the describing part of the software stored in the radio appliance.

3. System according to claim 1 or 2, characterized in that the division of the individual parameters into the sets of subparameters is chosen in such a way that they can each be used for a plurality of various waveform-specific entire sets of parameters.

* * * * *